Patented Aug. 24, 1937

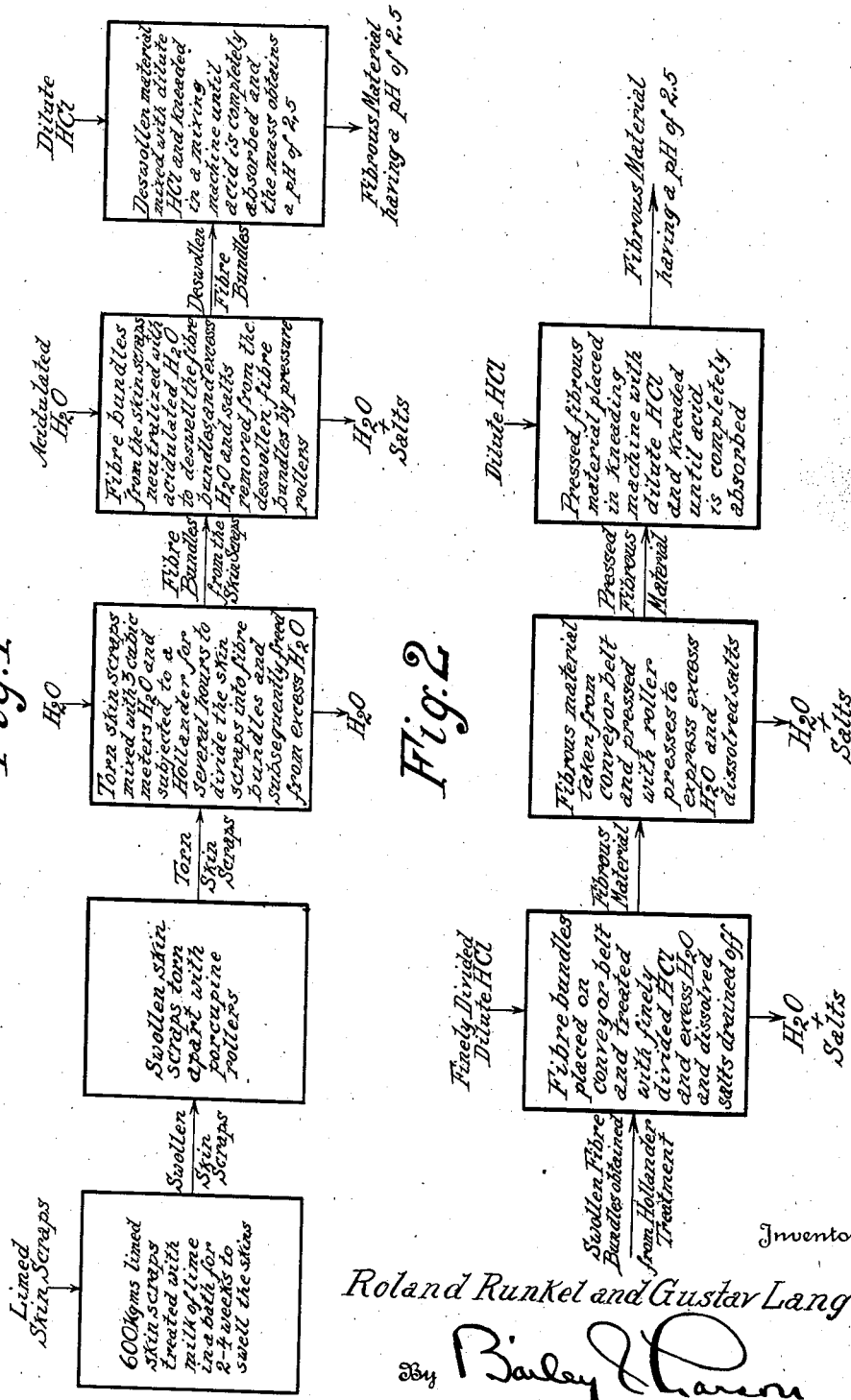

2,090,902

UNITED STATES PATENT OFFICE 2,090,902

METHOD OF PRODUCING FIBROUS MATERIALS FROM ANIMAL SKINS

Roland Runkel and Gustav Lange, Weinheim, Germany, assignors to Carl Freudenberg, G. m. b. H., Weinheim (Badenia), Germany, a German company Application August 31, 1934, Serial No. 742,352
In Germany September 5, 1933

10 Claims. (Cl. 92—14)

This invention relates to a process for the manufacture of fibrous materials from animal skins.

The mechanical shredding of skins which have been treated with swelling agents such as milk of lime, with conversion of the fibrous material thus obtained into products such as artificial leather, is already known.

In practice however the actual carrying out of these operations is accompanied by great difficulties. One of the chief difficulties is that the skins, which are to receive treatment, have very varying degrees of reactivity with respect to swelling agents on account of differences in their origin, size, thickness, tenacity, texture and the like. The mechanical shredding is thereby made much more difficult and products with varying qualities are obtained. It is impossible to prevent thick or compact and tough skins being unequally swollen throughout their mass, while other thinner and less tough skins are swollen right through, and again others suffer by too strong a chemical action especially on the surface. These difficulties can to a certain extent be mitigated by a careful pre-sorting of the skins to be used, in respect of their origin, tenacity, texture, size and other characteristics, but the difficulties cannot be entirely overcome.

The object of the present invention is to overcome the aforesaid difficulties and to prepare fibrous material while preserving as far as possible the fibres and their good qualities, from the skins of oxen, cows and calves and the like.

According to the present invention skins or skin scraps are handled in such a way that with the aid of swelling agents they are brought into a state which permits a uniform tearing of the skins, and are then shredded by mechanical treatment to a more or less complete extent and in shredded condition are treated several times with swelling agents. By allowing the swelling agents to act on the skin substances which have been previously shredded, it is easier to regulate the action on the individual parts in a uniform manner so that the whole of the shredded material can be brought into a practically uniform swollen condition. By this means the further working up of the materials, especially the further shredding while preserving the fibres and their good qualities, is made much easier and fibre products of uniform good qualities are obtained.

The swelling action can be carried out with alkaline liquids, such as milk of lime, dilute soda lye, ammonia, or with acids, such as hydrochloric acid, sulphurous acid, formic acid, acetic acid, lactic acid, or with salt solutions, such as ammonium chloride, calcium chloride and the like.

Various swelling agents may be used and especially those in which the swelling treatment of the skins or skin scraps which are to be treated is carried out with alkaline materials, such as milk of lime, the mechanically shredded skins then being treated with acid swelling materials, such as dilute hydrochloric acid.

According to an embodiment of the invention normally limed skin scraps, or better still limed skin scraps which have received a supplementary treatment by steeping in milk of lime, are torn mechanically, the material in its torn form is subjected to a further swelling by treatment with acids, whereby it becomes uniformly swollen, and then subjected to further mechanical treatment in this condition, whereafter it is suitable for making into fibre bundles, fibre hanks and the like.

The second treatment with swelling materials, that is acids, can be carried out in connection with the first tearing of the skins or in connection with the mechanical treatments which follow later. Several treatments of the skin in a torn or in a more or less torn condition can take place with swelling agents of the same kind or with various swelling agents.

The first tearing can be carried out in such a way that the skins which have been treated with milk of lime and brought into a tearable condition are subjected to a careful tearing in the same type of disintegrator. Further tearing and shredding can be carried out with the aid of appropriate apparatus such as mixers, kneaders and the like in order to prepare it for making into fibre bundles, fibre hanks and the like. According to this method of working the swelling agent, for instance dilute acid, can be added in the first tearing operation or between the tearing and shredding operations or during the shredding operation or also during any of the various working steps. The tearing operation can if necessary precede a loosening treatment of the skins, for example by treatment with a porcupine roller. The tearing can also take place under water, that is to say by treating the skins in hollanders, in the manner usually employed in the paper industry. Undesirable or troublesome chemicals, such as lime, can be removed by means such as washing or neutralizing with acids and washing out the products thus produced, such as for example calcium chloride.

When working up limed skin scraps the procedure may be as follows. Leaving out the previous washing or surface washing, tearing is effected by mechanical treatment and the lime in the torn skin material is removed by washing or by acids and if necessary a further washing away of any salts produced. The torn material is then subjected to a uniform swelling by treating it for example with dilute acids and subjecting it either after addition of the swelling acids or during the addition of the swelling acids to a shredding treatment, for example in a kneading machine, whereby in consequence of the working action of the uniformly swollen material a uniform product is obtained.

The invention permits giving the fibrous material any desired hydrogen ion concentration (pH value) and thereby to make it especially suitable for certain kinds of further treatment.

An important application of the invention lies in the treatment of the torn or shredded skin material with liquid swelling agents, carried out so that it is unnecessary to use a greater quantity than is actually needed for a complete reaction. The swelling agent may suitably be applied as follows. The swelling agent, for example dilute hydrochloric acid, in suitable concentration and quantity, is applied to the shredded skin material in a finely divided form, such as spray, or by sprinkling it through nozzles or such like means. Comparative experiments have shown that the use of swelling agents in great excess causes serious loss of material, which can be avoided by using smaller quantities of swelling agent.

Further objects and advantages of the invention will appear more fully from the following examples, particularly when taken in view of the accompanying drawing which discloses flow sheets of preferred processes of the applicants.

In the drawing:

Fig. 1 shows a flow sheet of the preferred process of working up hide scraps to a pasty fibrous mass.

Fig. 2 shows a flow sheet of an alternate procedure for working up the hide scraps which have undergone a preliminary swelling and tearing.

Examples 1. 600 kgms. of limed skin scraps which have had the hair removed, so-called sized leather, are steeped in milk of lime and allowed to remain there for 2 to 4 weeks. The skin scraps are then if necessary torn apart by means of porcupine rollers, subjected in a hollander with 3 cubic metres of water to a tearing and shredding operation for several hours. The ensuing fibre bundles, fibre hanks and single filaments are treated to remove excess of liquid and neutralized with acidulated water, freed from the excess water and passed between pressure rollers. The acidifying for the purpose of removing the lime, the washing out and pressing can if necessary be repeated. The now deswollen fibrous material, for example one which has a pH value of about 4.5 (which is substantially the isoelectric point), is then treated in a kneading machine, for example a Werner-Pfleiderer kneading machine, with very weak hydrochloric acid until the mass has a pH value of about 2.5. The amount of acid liquid is so chosen that it is completely absorbed by the fibrous material during the kneading operation. During the treatment in the kneading machine any coarse fibres will be reduced to fine fibres so that a homogeneous mass of fibres results. The pasty swollen fibrous material is specially suitable for the manufacture of various materials such as artificial gut, artificial sausage skins, artificial leather and the like.

2. Skin scraps suitable for shredding are treated in a hollander according to Example 1. When the material has been divided into fibre bundles, fibre hanks and the like it is freed from the surplus amount of aqueous liquid and carried away on a conveyor belt. Before the material is carried off on the conveyor belt or during its travel it is treated with a swelling agent consisting of an aqueous hydrochloric acid solution in fine division and uniformly sprayed over the whole of the fibre material. The concentration and quantity of acid can be so adjusted that with a pH value lying in the neighbourhood of the isoelectric point (about 4.5 to 5.5) a complete deswelling of the fibrous materials takes place. The conveyor belt can for instance be so constructed that the liberated water in which the salts, for instance calcium chloride, are dissolved, which salts are formed owing to the addition of acid, is in part separated during the transport of the material. The swollen fibrous material coming from the conveyor belt is led to a roller press and freed therein from such water and dissolved salts as is possible. The fibrous material coming from the roller press, which has a dry fibre content of about 25–30%, is now treated with hydrochloric acid, acetic acid and the like in order to swell it, which can be effected by putting the material through a mixer and kneading machine and covering with the swelling material either before its introduction or during the operation. In this apparatus a further shredding of the fibrous material takes place and the material is thus brought into a more uniform state. At the same time it can be given any desired pH value. If, as in Example 1, the pH value is about 2.5, an 85–88% water-containing glassy-looking mass of fibres is obtained, which has the property of containing water so firmly that it cannot be removed by pressure. By various treatments with acid, the properties of the fibrous masses can be varied, for instance by allowing much less acid to react in the last machine. In this way less swelling occurs which is specially suitable for fibrous material to be used for tanning purposes. The fibrous material produced according to this invention can be worked up into various products such as artificial gut, artificial leather and the like. By means of careful drying it can also be brought into a suitable condition for storing and transport. The dry material can be brought into a pulpy or pasty condition by adding water or aqueous liquids.

What we claim is:

1. A method of producing pasty swollen fibrous material from animal skin material, which comprises treating the skin material with a solution of a swelling agent in water, thereby bringing the material into a condition suitable for tearing, mechanically tearing up the material while it is in a swollen condition preserving the fibres therein and then submitting the torn up material to another swelling with a solution of a swelling agent in water, till a fibrous material is obtained at least 85% of which consists of swelling water.

2. A method of producing pasty swollen fibrous material from animal skin material, which comprises treating the skin material with a solution of an alkaline swelling agent in water, thereby bringing the material into a condition suitable for tearing, mechanically tearing up the material while it is in a swollen condition preserving the fibres therein and then further treating the torn up material with a solution of an acid swelling agent in water, till a fibrous material is obtained at least 85% of which consists of swelling water.

3. A method of producing pasty swollen fibrous material from animal skin material according to claim 2, wherein milk of lime is used as alkaline swelling agent.

4. A method of producing pasty swollen fibrous material from animal skin material, which comprises treating the skin material with a solution of an alkaline swelling agent thereby bringing the material into a condition suitable for tearing, mechanically tearing up the material while it is in a swollen condition preserving the fibres therein, removing the alkaline swelling agent from the torn up material and again treating the torn up material with swelling agents, till a fibrous material is obtained at least 85% of which consists of swelling water.

5. A method of producing pasty swollen fibrous material from animal skin material, which comprises treating the skin material with a solution of a swelling agent in water, thereby bringing the material into a condition suitable for tearing, mechanically tearing up the material while it is in a swollen condition preserving the fibers therein and then submitting the torn up material to another swelling with a solution of a swelling agent in water and shredding the same, till a fibrous material is obtained at least 85% of which consists of swelling water.

6. A method of producing pasty swollen fibrous material from animal skin material, which comprises treating the skin material with a solution of a swelling agent in water, thereby bringing the material into a condition suitable for tearing, mechanically tearing up the material while it is in a swollen condition preserving the fibres therein, then further treating the material with a solution of a swelling agent in water while shredding the same, till a fibrous material is obtained at least 85% of which consists of swelling water.

7. A method according to claim 1, wherein the solutions of swelling agents in water are brought in a finely divided form into contact with the torn skins.

8. A method according to claim 1, wherein solutions of swelling agents in water are brought into contact with the torn skins in such quantities, that they are substantially absorbed by the fibre masses and firmly retained by them.

9. A method of producing pasty swollen fibrous materials from animal skin material, which comprises treating the skin with alkaline swelling agents, thereby bringing the material into a condition suitable for tearing, mechanically tearing up the material while it is in a swollen condition preserving the fibres therein, then further treating the material with acid in an amount sufficient to neutralize the same and bring the pH value of the material substantially to the isoelectric point, and then treating the material with acid swelling agents while beating the same in the presence of water.

10. A method of producing pasty swollen fibrous materials from animal skin material, which comprises treating the skin with alkaline swelling agents, thereby bringing the material into a condition suitable for tearing, mechanically tearing up the material while it is in a swollen condition preserving the fibres therein, and then further treating the material with acid swelling agents in sufficient quantity to bring the pH value of the material substantially to 2.5.

ROLAND RUNKEL.
GUSTAV LANGE.